UNITED STATES PATENT OFFICE.

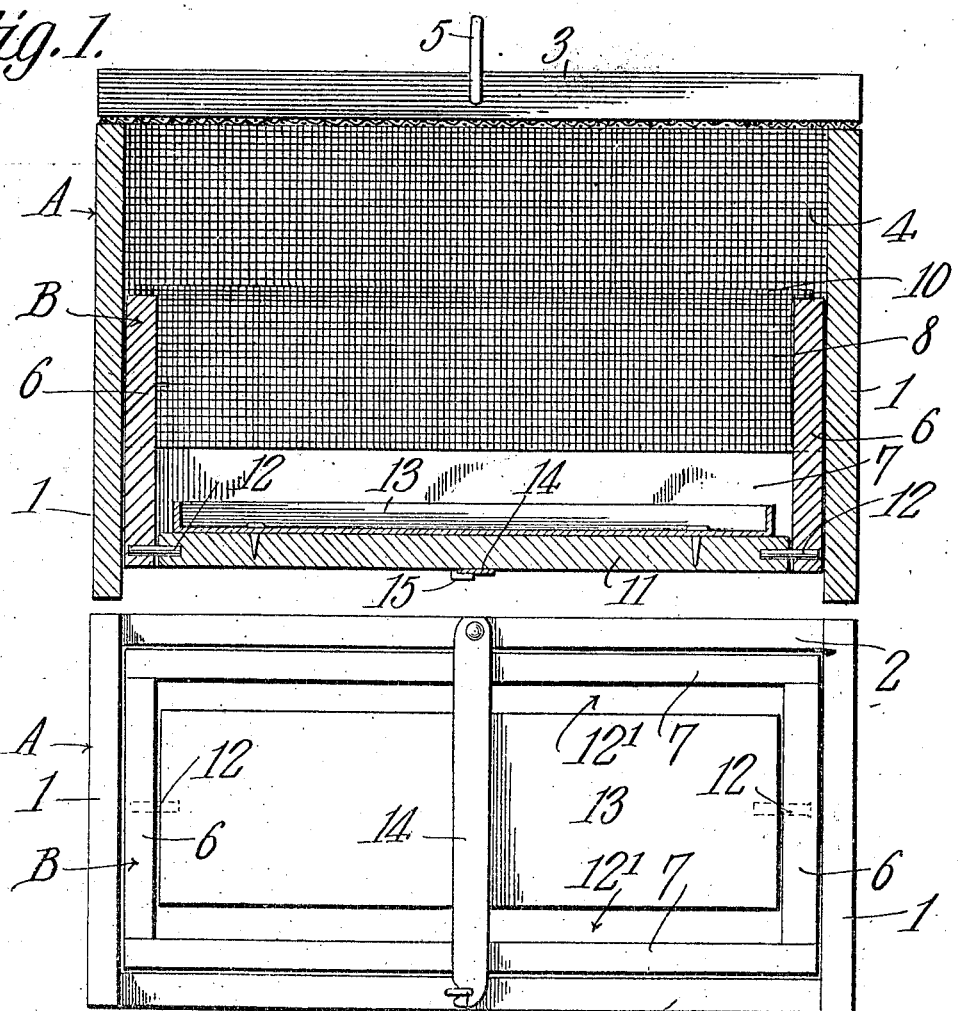

JOHN WALLACE SPURRIER, OF HATTIESBURG, MISSISSIPPI.

INSECT-TRAP.

No. 871,305.   Specification of Letters Patent.   Patented Nov. 19, 1907.

Application filed August 6, 1907. Serial No. 387,335.

*To all whom it may concern:*

Be it known that I, JOHN WALLACE SPURRIER, a citizen of the United States, residing at Hattiesburg, in the county of Perry and State of Mississippi, have invented a new and useful Insect-Trap, of which the following is a specification.

This invention relates to insect traps and is particularly designed for catching flies, roaches, etc.

The object of the invention is to provide a trap of simple, durable and efficient construction having removable means whereby insects after once entering the trap can not leave the same unless the trap is opened.

A still further object is to provide a novel arrangement of bait holder to which access may readily be had without the necessity of opening the trap.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a longitudinal section through the trap. Fig. 2 is a bottom plan view. Fig. 3 is a transverse section.

Referring to the figures by characters of reference, A designates the cage of the trap, the same consisting of heads 1, 1 preferably formed of wood and connected by side strips 2 and a top strip 3. Fastened to the heads and to the side and top strips is a cover 4 preferably of wire fabric. It will be seen by referring particularly to Figs. 1 and 2 that the heads 1 extend below the side strips a sufficient distance to permit insects to readily travel under said side strips. A loop 5 or other suitable device is connected to the top strip to facilitate the suspension of the trap. A receiver B is insertible into the trap and consists of heads 6 connected by side strips 7. The heads are pointed and extend above the side strips and secured to the heads and strips is a cover 8 preferably formed of wire fabric. This cover is slit or cut longitudinally between the apexes of the heads 6 as indicated at 9 to form an outlet the wire ends adjacent the outlet being preferably extended upward as shown at 10 to constitute means for preventing the escape of insects from the cage A and into the receiver B. The bottom of the receiver is provided with a panel 11 mounted on trunnions 12 extending into the heads 6 close to the lower edges thereof and this panel is of such a width that inlet openings 12 are formed between the sides thereof and the strips 7, the openings being sufficiently large to permit flies, roaches, and other small insects to readily pass upward into the receiver. A tray 13 is secured upon the panel 11 and is designed to contain suitable bait. The receiver B is disposed to fit snugly between the heads 1 and side strips 2 and is held in place by a locking strip 14 pivoted to one of the side strips 2 and disposed to engage a hook 15 upon the other side strip 2. When it is desired to use the trap the same is inverted and strip 14 is swung away from the receiver B. Panel 10 is then swung upon its trunnions until the tray assumes a position outside of the trap whereupon suitable bait such as sugar or the like is placed in the tray. The tray is then returned to its initial position and secured by swinging strip 14 under the panel 11 and into engagement with hook 15.

If the trap is placed upon a table or other structure insects can freely travel under the side strips 2 and upward through the openings 12 to the bait within the tray 13. The insects instinctively travel upward in endeavoring to escape from the receiver and will therefore pass through the opening 9 and into the cage 4 from which it will be impossible for them to escape.

The trap is opened by first swinging the strip 14 from under the receiver and then drawing the receiver outward from the cage. If preferred, the trap can be suspended within a room, this being done especially where flies are to be caught.

It will be seen that the trap is very simple, and efficient and by providing a bait holder which can be reached without the necessity of opening the trap the device can be readily prepared for use.

What is claimed is:

1. In a trap the combination with a cage; of a receiver detachably mounted within and constituting a closure for the bottom of the cage, said receiver opening into the cage, and means extending transversely of and constituting a support for the receiver.

2. In a trap the combination with a cage; of a receiver detachably mounted within and constituting a closure for the bottom of the cage, said receiver opening into the cage, a bait holder within the receiver, and means connected to the cage and constituting retaining means for the receiver and bait holder.

3. In a trap the combination with a cage, and a receiver extending and opening into the cage; of a tray mounted to swing within the receiver and constitute a partial closure therefor.

4. In a trap the combination with a cage, and a receiver extending and opening into the cage; of a tray mounted to swing within the receiver and constitute a partial closure therefor, and means for holding the tray against movement.

5. In a trap the combination with a cage; of a receiver detachably mounted therein and having an outlet opening into the cage, a panel mounted to swing within the receiver, there being inlet openings at opposite sides of the panel, and a bait holder upon and movable with the panel.

6. In a trap the combination with a cage; of a receiver detachably mounted therein and having an outlet opening into the cage, a panel mounted to swing within the receiver, there being inlet openings at opposite sides of the panel, a bait holder upon and movable with the panel, and means connected to the cage and extending transversely of the receiver and panel for holding the same against displacement.

In testimony that I claim the foregoing as my own, I have hereto affixed my signature in the presence of two witnesses.

JOHN WALLACE SPURRIER.

Witnesses:
A. L. THRASH,
THOS. J. CAMPBELL.